(12) United States Patent
Herrmann (10) Patent No.: US 10,071,542 B2
(45) Date of Patent: Sep. 11, 2018

(54) PROCESS FOR THE COATING OF ROLL PRODUCT

(71) Applicant: BASF SE, Ludwigshafen (DE)

(72) Inventor: Juergen Herrmann, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/120,043

(22) PCT Filed: Feb. 18, 2015

(86) PCT No.: PCT/EP2015/053353
§ 371 (c)(1),
(2) Date: Aug. 18, 2016

(87) PCT Pub. No.: WO2015/124587
PCT Pub. Date: Aug. 27, 2015

(65) Prior Publication Data
US 2017/0246848 A1    Aug. 31, 2017

(30) Foreign Application Priority Data
Feb. 19, 2014  (EP) .................................. 14155671

(51) Int. Cl.
B29C 65/02    (2006.01)
B32B 37/02    (2006.01)
(Continued)

(52) U.S. Cl.
CPC ........ B32B 37/025 (2013.01); B32B 37/0046 (2013.01); B32B 37/12 (2013.01);
(Continued)

(58) Field of Classification Search
CPC ... B32B 37/025; B32B 37/0046; B32B 37/12; B32B 39/00; B32B 2038/1891;
(Continued)

(56) References Cited

U.S. PATENT DOCUMENTS

| 2008/0251191 A1* | 10/2008 | Schafer | B29C 33/42 156/242 |
| 2008/0299354 A1* | 12/2008 | Zydonik | B29C 47/0019 428/195.1 |
| 2011/0120635 A1 | 5/2011 | Jokisch et al. | |

FOREIGN PATENT DOCUMENTS

EP    1 859 066 B1    2/2010
WO    WO 2004/092299 A1    10/2004
(Continued)

OTHER PUBLICATIONS

International Search Report dated May 13, 2015, in PCT/EP2015/053353 filed Feb. 18, 2015.

*Primary Examiner* — Sonya Mazumdar
(74) *Attorney, Agent, or Firm* — Oblon, McClelland, Maier & Neustadt, L.L.P.

(57) ABSTRACT

The invention relates to a process for the production of multilayer composites and to a production plant (12, 60) for this purpose. The multilayer composites comprise at least one substrate web (64, 66), at least one bonding layer, and at least one polyurethane layer which has capillaries which extend through the entire thickness of the at least one polyurethane layer. First, at least one polyurethane layer is produced in a matrix (15), with passage through at least one coating unit (26, 30) and through a plurality of heating units (24, 28, 32). The matrices (15) thus treated are then introduced (76) into an input point (74) of a transfer section (60) for substrate web (64, 66). A structured side (78) of the matrix (15) is applied onto the substrate web (64, 66) passing continuously through the transfer section (60). Treatment of a composite made of the matrix (15) and of the substrate web (64, 66) takes place in a heatable press device (82) with transfer of the at least one polyurethane layer from the matrix to the upper side of the substrate web (64, 66). Finally, the matrix (15) is removed from the substrate web (Continued)

(64, 66), and transferred to a treatment section (12), and the substrate web (64, 66) is wound up at a wind-up unit (100) after removal of the matrix.

23 Claims, 2 Drawing Sheets

(51) Int. Cl.
*B32B 37/14* (2006.01)
*B32B 38/10* (2006.01)
*B32B 37/00* (2006.01)
*B32B 37/12* (2006.01)
*B32B 39/00* (2006.01)
*B32B 38/18* (2006.01)

(52) U.S. Cl.
CPC .............. *B32B 38/10* (2013.01); *B32B 39/00* (2013.01); *B32B 37/00* (2013.01); *B32B 2038/1891* (2013.01); *B32B 2309/70* (2013.01); *B32B 2317/08* (2013.01)

(58) Field of Classification Search
CPC . B32B 2309/70; B32B 2317/08; B32B 27/00; B32B 38/10
USPC ........................................ 156/249, 256, 267
See application file for complete search history.

(56) References Cited

FOREIGN PATENT DOCUMENTS

| | | |
|---|---|---|
| WO | WO 2005/047549 A1 | 5/2005 |
| WO | WO 2007/033968 A3 | 3/2007 |
| WO | WO 2007/114420 A1 | 10/2007 |
| WO | WO 2009/106503 A1 | 9/2009 |
| WO | WO 2010/007042 A1 | 1/2010 |

\* cited by examiner

PROCESS FOR THE COATING OF ROLL PRODUCT

The invention relates to a process for the coating of roll product such as substrates or textile webs, for the production of velvet surfaces or, respectively, velvet-like surfaces in combination with provision of individual design, and also to a production plant suitable for this purpose.

WO 2005/047549 A1 relates to a substrate provided with a finish. The substrate has a velour-like finely fibrous upper side. The visible side of the finish has a grain structure. The substrate is in particular a grain leather with a buffed grain side forming the upper side, a split leather with buffed upper side, or a synthetic velour material with an upper side composed of microfibers, where the finish is composed of a solidified plastics dispersion and is separately produced on an underlay with a structured surface corresponding to the grain structure, and has been bonded to the substrate by way of bonding layer which has been formed from a solidified plastics dispersion comprising polyurethane and which has been applied on the upper side of the substrate. The finish has capillaries passing through its entire thickness, and has in essence the same thickness both in the region of the high areas of the grain and in the region of the low areas of the grain. A single thin bonding layer bonds the finish to the substrate.

EP 1 859 066 B1 relates to a matrix with small bowl-like depressions. The matrix serves for the production of a coating which can be bonded to a two-dimensional substrate and which is formed via application of a liquid plastics dispersion to the matrix surface composed of a hydrophobic flexible plastic and subsequent solidification of the plastics dispersion. The gloss level of the surface in accordance with DIN 67530 at an angle of incidence of 60° is less than 2.2, and the surface has microscopically small bowl-like depressions. These have been formed via laser treatment of the surface. The center-to-center distance between adjacent bowl-like depressions is from 50 µm to 150 µm, and the depth of the bowl-like depressions is from 50 µm to 150 µm.

WO 2007/033968 A3 relates to a process for the production of matrices for the production of decorative finishes. The matrix serves in particular for the production of a surface-structured coating which can be bonded to a two-dimensional substrate, in particular to a leather or to a textile material. Said coating is formed via application of a liquid plastics material to the surface of the matrices and subsequent solidification of the plastics material. The matrix has a surface structure that corresponds to the surface structure of the coating, and the surface structure of the matrix here produced via laser engraving.

WO 2009/106503 A1 relates to multilayer composite materials which comprise a textile sheet, a process for producing these, and use of these. Multilayer composite materials are disclosed which have, as components, a textile sheet, optionally at least one bonding layer, and one polyurethane layer which comprises capillaries running through the entire thickness of the polyurethane layer, where the textile sheet and the polyurethane layer have been bonded to one another directly or by way of a bonding layer.

WO 2010/007042 A1 relates to a process for the continuous production of multilayer composites. The multilayer composites comprise at least one substrate web, at least one bonding layer, and at least one polyurethane layer which has capillaries running through the entire thickness of the polyurethane layer. A matrix is used to produce the polyurethane layer, and a material which becomes the bonding layer is used to fix this polyurethane layer on the substrate web. The temperature of the matrix is from 80° C. to 170° C., and its heat capacity is in the range from 100 to 20 000 J/K·m².

Processes for coating of a substrate web, for example the production of a breathable leather finish, have high manual content. The production of velvet surfaces or, respectively, velvet-like surfaces (soft-touch) in combination with provision of individual design on the visible side of the substrate web has proceeded via the abovementioned production processes with high manual content. Application sectors such as the textile industry are not accessible by this route. Those applications require a process for the coating of roll product such as textile, nonwovens, paper, etc. that does not involve cutting of, or prefabrication of, the roll product. The disadvantages of the process sequence used hitherto with high manual content result from the requirement for application-specific prefabrication work on each roll of substrate web supplied. In the current coating processes, pieces of material to be coated are placed manually onto pretreated matrices. Operations are restricted to area dimensions of 160 cm×160 cm. Another restriction on the current processes arises from restriction of the per-minute cycle time for matrices to be processed, or for composites to be processed, made of substrate web and matrices, by virtue of the required residence time in a press. Another extremely disadvantageous factor relating to the cycle time is that the finished product obtained has to be removed manually from the production plant, and the individual pieces require complicated transport and complicated storage.

There is a growing requirement for multilayer composites such as coated leather, coated textile, or coated cellulose-fiber products. In particular, there is a large application sector for polyurethane-coated composites such as those described by way of example in WO 2005/047549 A1, because they combine numerous very different properties. They combine the mechanical properties of leather, with breathability, with pleasant appearance and attractive haptic properties.

However, there remains a lack of processes that permit relatively large-scale production of composites of this type, in particular those of multilayer design, at low cost. The processes used hitherto are piece-to-piece processes and have high manual content.

The disadvantages outlined above of the prior art are eliminated by the process of the invention for the continuous production of multilayer composites, and also by a production plant which can carry out said process.

In the process of the invention for the continuous production of multilayer composites, these comprise at least one substrate web, at least one bonding layer, and at least one polyurethane layer which has capillaries which extend through the entire thickness of the polyurethane layer, where the materials pass through the following steps:

a) production of the at least one polyurethane layer in a matrix, with passage through at least one coating unit and a plurality of heating units,
b) introduction of the matrix according to step a) into an input point of a transfer section for substrate web,
c) application of a structured side of the matrix to the substrate web passing continuously through the transfer section,
d) treatment of a composite made of matrix and of substrate web in a press device with transfer of the at least one polyurethane layer to the substrate web,
e) removal of the matrix from substrate web,
f) transfer of the matrix to a treatment section, and
g) continuous wind-up of the substrate web at a wind-up unit.

The process proposed in the invention is more efficient and faster and by way of example permits treatment of at least 5.12 m² of substrate web per minute. The decisive factor influencing the cycle time of the process proposed in the invention and of the production plant proposed in the invention is the waiting time which arises through the treatment of a composite made of matrix and of substrate web in a press device in which the at least one polyurethane layer is transferred to the substrate web.

By virtue of the process proposed in the invention it is possible to achieve a considerable cost saving, since prefabrication of the substrate web can be omitted; this is conveyed continuously through a transfer section of the production plant, and in particular is unwound at an unwind unit and, after full treatment, is rewound at a wind-up unit in the form of finished roll product. Considerably easier handling can be achieved since the substrate web takes the form of roll product. In particular moreover in contrast to "piece-to-piece" processes known hitherto there is now no requirement for any personnel for the placing of the substrate web, and a further saving can be achieved in terms of personnel previously used to remove the matrix from the pieces of substrate that were hitherto prefabricated. Since it is now possible simply to use an automated handling device to introduce and remove the matrix in which at least one polyurethane layer is produced, considerably easier handling can be achieved, contrasting with the very substantially manual handling used hitherto for prefabricated pieces of substrate measuring 1.6 m×1.6 m, and it is moreover possible in particular to achieve considerably easier and lower-cost outward transport of fully treated roll product from the wind-up unit at the end of the transfer section.

The in particular multilayer composites which can be produced on an industrial scale via the process proposed in the invention are breathable composites. However, it is also possible to design non-breathable composites produced by the process proposed in the invention, for example in that the capillaries passing through the at least one polyurethane layer are designed to be non-pervasive.

The composites proposed in the invention comprise at least one substrate web.

A very wide variety of materials can be used by a substrate web, for example textile, cellulose materials such as paper and paperboard, and preferably leather, respective terms used for these here and hereinafter being textile, cellulose material, and leather. Other suitable materials, however, are synthetic leather, foils, in particular metal foils or polymer foils, and polyurethane, in particular thermoplastic polyurethane, for example in the form of foam. In one possible embodiment, the substrate web can be non-breathable, and in a preferred embodiment the substrate web is selected from breathable materials. Textile or textiles can be used in various forms. By way of example, woven fabrics, felt, knitted fabrics, wadding, laid scrims and woven microfiber fabrics, and also non-wovens, are suitable.

Textile is in particular non-wovens, woven fabrics, or knitted fabrics. Textile can be selected from lines, cords, ropes, yarns, or threads. Textile can be of natural origin, an example being cotton, wool, or flax, or of synthetic origin, an example being polyamide, polyester, modified polyesters, polyester blend fabrics, polyamide blend fabrics, polyacrylonitrile, triacetate, acetate, polycarbonate, polyolefins such as polyethylene and polypropylene, polyvinyl chloride, and also polyester microfibers and glassfiber fabrics. Very particular preference is given to polyester, cotton, and polyolefins such as polyethylene and polypropylene, and also to selected blend fabrics selected from cotton-polyester blend fabrics, polyolefin-polyester blend fabrics, and polyolefin-cotton blend fabrics.

Textile can be untreated or treated textile, for example bleached or dyed. It is preferable that textile has been coated only on one side or else is uncoated. Textile can have been modified, and in particular textile has been modified so as to have easy-care and/or flame-retardant properties. The weight per unit area of textile can moreover be in the range from 10 g/m² to 500 g/m², preferably from 50 g/m² to 300 g/m².

Cellulose material can be various types of cellulose materials, and the expression therefore includes hemicellulose and lignocellulose. Cellulose material can be wood or particle board. The term wood here comprises by way of example coated and uncoated wood, and for the purposes of the present invention wood can have been modified so as to have biocidal properties, and veneer is also classified as wood.

The cellulose material can also be a composite material made of natural fibers and plastic, another term used for this being wood-plastic composite, generally abbreviated to WPC. The cellulose material can be paperboard or paper. Paper can be uncoated or preferably coated or can have been modified by officially recognized methods. In particular, paper can be bleached paper. Paper can comprise one or more pigments, for example chalk, kaolin, or $TiO_2$, and paper and paperboard can be uncolored (having natural color) or colored. Paper and paperboard in the present context can be unprinted or printed.

Paper can be Kraft paper or paper modified with polyacrylate dispersion.

It is also possible to use plastics foils or metal foils as substrate, and the abbreviated term foils is used for these.

In the present context, the term foils means sheets of metal or of a natural or preferably synthetic polymer which have a thickness of from 0.5 mm to 1 mm, preferably from 0.1 mm to 0.5 mm, and particularly preferably up to 0.15 mm. The term foils in the present context also subsumes plastics-metal foils.

It is preferable that foil has manual flexibility, i.e. flexibility that does not require assistance from a tool. Metals are preferably materials selected from silver, gold, iron, copper, tin, and in particular aluminum. Polymers are preferably polyolefins, such as polyethylene and polypropylene, or else polyester, polyamide, polycarbonate, polyvinyl chloride, polyurethane, polymethyl methacrylate, and polystyrene, where the term polyolefins such as polyethylene and polypropylene means not only the relevant ethylene homopolymers and propylene homopolymers but also copolymers with other olefins, for example with acrylic acid or 1-olefins. The term polyethylene in particular means ethylene copolymers with from 0.1% by weight to less than 50% by weight of one or more 1-olefins such as propylene, 1-butene, 1-pentene, 1-hexene, 1-octene, 1-decene, or 1-dodecene, preference being given here to propylene, 1-butene, and 1-hexene. The term polypropylene in particular also means propylene copolymers with from 0.1% by weight to less than 50% by weight of ethylene and/or of one or more 1-olefins such as 1-butene, 1-pentene, 1-hexene, 1-octene, 1-decene, or 1-dodecene, preference being given here to ethylene, 1-butene and 1-hexene. The term polypropylene here preferably in essence means isotactic polypropylene.

Foils made of polyethylene can be produced from HDPE or LDPE or LLDPE. Among foils made of polyamide, preference is given to those based on nylon-6. Among foils made of polyester, preference is given to those made of polybutylene terephthalate and in particular made of polyethylene terephthalate (PET). Among foils made of polycarbonates, preference is given to those based on polycarbonates produced with use of bisphenol A. The expression foils made of polyvinyl chloride means foils made of rigid polyvinyl chloride or of flexible polyvinyl chloride, and the expression flexible polyvinyl chloride here also comprises copolymers of vinyl chloride with vinyl acetate and/or with acrylates. Among foils made of polyurethane, preference is given to those made of thermoplastic polyurethane, known as TPU foils. Foils can also comprise composite foils, for example foils which comprise one of the abovementioned foils and a metal foil or paper.

The substrate of the preferably multilayer composite can also be leather. For the purposes of the present invention, the term leather comprises tanned animal hides, which may, or preferably may not, have been provided with a finish. A wide variety of tanning methods can be used, for example using chrome tannings, other mineral tannings such as aluminum compounds or zirconium compounds, or using polymeric tannings, for example homo- or copolymers of (meth)acrylic acid, using aldehydes, in particular using glutaraldehyde, using synthetic tannings such as condensates of aromatic sulfonic acids with aldehydes, in particular with formaldehyde, or with other compounds containing carbonyl groups, for example condensates of aromatic sulfonic acids with urea. Other suitable leathers are those tanned with vegetable tannings and/or enzymatically. Other suitable leathers have been tanned with a mixture of two or more of the abovementioned tannings.

For the purposes of the present invention, leather can moreover have passed through one or more of the operations known per se, for example hydrophobization, fat liquoring, retanning, or dyeing.

Leather can by way of example be obtained from hides of cattle, of pigs, of goats, of sheep, of fish, of snakes, of wild animals, or of birds. The thickness of leather can be in the range from 0.2 mm to 2 mm. Preference is given to grain leather. Leather can be free from raw hide defects, but leather which includes raw hide defects, caused for example by injuries due to barbed wire, fights between animals, or insect bites, is also suitable. In one embodiment in the present invention, the leather is split, or is split leather. The leather can also be suede leather or split suede.

Substrate used for the purposes of the present invention can comprise not only real leather but also synthetic leather. For the purposes of the present invention, the expression synthetic leather also covers synthetic leather precursors and specifically those in which the uppermost layer, i.e. the outer layer, is absent. For the purposes of the present invention, synthetic leather is plastics-coated, preferably textile sheets with or without outer layer, where any outer layer present has a leather-like appearance. Examples of synthetic leather are woven-fabric-based synthetic leather, nonwoven-based synthetic leather, fiber-based synthetic leather, and foil-based synthetic leather, and foam-based synthetic leather. The expression synthetic leather also covers products with two outer layers, for example nonwoven-based synthetic leather. Particularly preferred synthetic leathers are breathable polyurethane-based synthetic leathers as are by way of example described in Harro Träubel, New Materials Permeable to Water Vapor, Springer Verlag 1999. Preference is further given to substrates where an open-cell polyurethane foam is applied onto a textile carrier, for example in the form of mechanical foam or by a direct foam-backing process.

In a possible embodiment of the present process, the substrate can be selected from real leather, synthetic leather, metal foils or plastics foils, textile, or cellulose materials.

In a preferred embodiment of the present invention, the substrate is one which at the beginning of the production process of the invention is taken from storage systems, for example continuously from one or more rolls, i.e. is roll product.

Composites produced in the invention, in particular multilayer composites, moreover have at least one bonding layer. The bonding layer can be a discontinuous layer, i.e. a layer not present across the entire surface, or can be a layer applied across the entire surface. It is preferable that the bonding layer is a layer of a cured, organic adhesive. The bonding layer is formed by a material which becomes a bonding layer, through the action of heat.

The bonding layer can be a layer applied in the form of points, of strips, or of a grid, for example taking the form of parallelograms, rectangles, or squares, or of a honeycomb structure. At the gaps in the bonding layer, the at least one polyurethane layer then comes into contact with the substrate, which preferably takes the form of web.

In a possible variant of the bonding layer, this is a layer of a cured, organic adhesive, for example based on polyvinyl acetate, polyacrylate, and in particular polyurethane, preferably polyurethanes with glass transition temperature below 0° C. The curing of the organic adhesive can by way of example have taken place thermally, via actinic radiation, or via aging. In another possible embodiment of the bonding layer, this can be an adhesive network. The maximum thickness of the at least one bonding layer is 100 µm, preferably 50 µm, particular preferably 30 µm, very particularly preferably 15 µm.

The bonding layer can comprise hollow microspheres. The term microspheres means, in the present context, spherical particles with an average diameter in the range from 5 µm to 20 µm made of polymeric material, in particular of halogenated polymer, for example polyvinyl chloride, or polyvinylidene chloride, or copolymer of vinyl chloride with vinylidene chloride. Hollow microspheres can be unfilled or can preferably have a filling of a substance with boiling points slightly lower than room temperature, for example of n-butane and in particular of isobutane. In a possible embodiment, the microspheres can also have a filling of isopentane.

According to the solution proposed in the invention, the at least one polyurethane layer, in particular substrate taking the form of a web, can have been bonded by way of at least two bonding layers of identical or different composition: one of the bonding layers can comprise a pigment, and the other of the two bonding layers can be pigment-free. In one variant, one of the bonding layers can comprise hollow microspheres while the other bonding layer does not.

There follows a more detailed description of the process proposed in the invention for the continuous production of multilayer composites:

In the procedure for carrying out the process of the invention, a matrix is used to produce at least one polyurethane layer and a material which becomes the at least one bonding layer is used to fix this at least one polyurethane layer on the substrate, which preferably takes the form of a web. The temperature of the matrix is in the range from 80° C. to 270° C., and the matrix comprises a heat-transfer medium with heat capacity in the range from 100 J/K·m² to 20 000 J/K·m². The fixing and/or the application of the material which becomes bonding layer preferably takes place continuously here.

At least one formulation of at least one polyurethane is used to produce the at least one polyurethane layer. Preferred formulations are aqueous emulsions, dispersions, or solutions, but solutions or dispersions in adequately volatile organic solvents are also suitable for this purpose. Preference if given to formulations in a medium that is not combustible, in particular water.

The temperature of the matrix is in the range from 80° C. to 170° C., preferably from 85° C. to 130° C., and particularly preferably up to 110° C. This temperature is always the surface temperature at the start of the application of the at least one polyurethane layer. It is preferable that the surface temperature at the end of the hardening of polyurethane to give the at least one polyurethane layer is also in the range above 60° C. The heat capacity of the matrix is in the range from 100 J/K·m$^2$ to 20 000 J/K·m$^2$, preferably from 500 J/K·m$^2$ to 15 000 J/K·m$^2$. Square meters here always refer to the surface of the matrix. The heat capacity here is the quantity of heat required to heat one square meter of the matrix by one degree Kelvin at the surface.

In a possible variant, the matrix used also comprises a heat-transfer medium. The heat-transfer medium/media is/are suitable for maintaining a matrix temperature sufficiently high to provide adequately rapid evaporation of water and/or organic solvent(s) during production of the at least one polyurethane layer. In embodiments in which the matrix comprises a heat-transfer medium, the heat-capacity values refer to the combination of actual matrix and heat-transfer medium.

By way of example, heat-transfer media used with matrices can be a heated or heatable metal body, for example in the form of a tape or in the form of one or more plates or bars, which can have connection to one another, or in the form of a grid, or in the form of connected rings similar to chain mail. Heated metal bodies can by way of example be heated by electrical current, by steam with a temperature above 110° C., or preferably by superheated steam, i.e. steam with a temperature in the range from 300° C. to 400° C. Metal bodies thus heated can be heated continuously or semicontinuously, i.e. heating medium is introduced when the temperature has fallen below a certain minimum temperature, and the introduction of heating medium is interrupted again once a particular maximum temperature has been exceeded.

In another embodiment, heat-transfer media made of metal bodies with high heat capacity are used, in particular in the range from 100 J/K·m$^2$ to 20 000 J/K·m$^2$, examples being metal plates. Metal plates of this type are heated at one point in the production plant suitable for carrying out the process proposed in the invention, and are used at another point for the production of the at least one polyurethane layer.

In another embodiment, the heat-transfer medium is metal integrated into the matrix. Examples are metal foils, flexible metal grids of the nature of a metal net, and also metal bars or honeycombs, or metal wool, preference being given to heatable metal wires. The heat-transfer medium can also be an electrically heated wire or a combination of electrically heated wires which by way of example have been integrated into the actual matrix. The combination of electrically heated wires can by way of example include a plurality of helices.

In another possible embodiment, the matrix is a silicone matrix of particularly high thickness, for example in the range from 0.5 cm to 2 cm, preferably up to 1 cm. Matrices having this type of thickness, and in particular silicone matrices having this type of thickness, themselves have particularly high heat capacity and are themselves the heat-transfer media in the relevant embodiment.

The matrix can by way of example be a silicone-covered material, for example metal, in particular steel or aluminum. Matrices designed as silicone matrices have particularly high thickness, where the relevant matrix and in particular the relevant silicone matrix, has been doped with at least one material which itself has high heat capacity, for example graphite, oils, waxes, in particular paraffin waxes, and latent-heat accumulators, in particular latent-heat accumulators of encapsulated design, as are disclosed by way of example in WO 2004/092299 A1.

In one preferred embodiment of the process proposed in the invention, a silicone matrix is used which is continuously or discontinuously heated by microwaves during the conduct of the process. The matrix can take the form of continuous strip which is passed over rollers at various apparatus components at which operations are carried out. Apparatus parts that may be mentioned are by way of example spray nozzles, spray guns, calenders, semicontinuously operating presses, in particular roller presses, flat-bed lamination machinery, and also light sources, heating apparatuses (IR sources), and drying apparatuses, for example ovens or fans. In another possible embodiment, the matrix can take the form of a matrix applied onto a metal roller or onto a metal drum, by a "seamless" method, i.e. with minimum possible seam between the start and the end of the matrix, thus permitting utilization of the entire length of the matrix.

The process proposed in the invention can use matrices which have a heat-transfer medium with heat capacity in the range from 100 J/K·m$^2$ to 20 000 J/K·m$^2$. The procedure in an embodiment of the production process of the invention is that a matrix is used to form the at least one polyurethane layer, at least one organic adhesive is applied over the entire surface or partially onto a substrate which in particular takes the form of a web, and/or onto the at least one polyurethane layer, and then the at least one polyurethane layer is bonded to the substrate web at points, at strips, or over the entire area. The heat-transfer medium comprised by the matrix ensures that, during the entire time during which organic adhesive is applied to the at least one polyurethane layer, the matrix has, and also retains, an adequately high temperature.

The procedure in an advantageous possible embodiment of the process proposed in the invention is that first the at least one polyurethane film is provided, organic adhesive is provided, for example spread or sprayed, to at least one substrate web or to the least one polyurethane film, or to both, in each case to part of an area, for example in the form of a pattern, and then the two areas are brought into contact with one another. The composite thus obtainable can then be compressed or heat-treated, or compressed with heating. The compression can by way of example by achieved by using a system of counter-rotating temperature-controllable rollers or, respectively, rolls.

A polyurethane film forms the at least one subsequent polyurethane layer of the multilayer composite produced in the invention. The polyurethane film can be produced as follows:

Preferably aqueous polyurethane dispersion can be applied onto the matrix by methods known per se, in particular via continuous spray-application, for example by a spray gun. The matrix can have a smooth surface, but this preferably has a structure. Matrices are generally structured via laser engraving or by replication. The structuring can by way of example correspond to a pattern. It is particularly preferable that the structuring corresponds to a negative of a leather-grain pattern or to the negative of a Nubuk. Other particularly preferred structures correspond to the surfaces of wood, or a technical surface for example having a carbon appearance, and 3D effects are also included here. The structures can comprise, in addition to the structure itself, pictorial designs, signatures, coats of arms, or one or more company logos.

In an advantageous possibility for conduct of the process proposed in the invention, a matrix is provided which has an elastomeric layer, or else has a layer composite, comprising an elastomeric layer on a carrier, where the elastomeric layer comprises a binder and also optionally other additional and auxiliary substances. The provision of the matrix can comprise the following steps:
1) application of a liquid binder which optionally comprises additional and/or auxiliary substances onto a patterned surface, for example a male mold or an original pattern,
2) hardening of the binder, for example via thermal hardening or radiation curing, or via aging,
3) release of the structured medium thus obtainable and optionally application onto a carrier, for example a metal plate or a metal cylinder,
4) optionally bonding of a plurality of relatively small matrices thus obtainable to give a larger matrix, in particular a silicone strip.

In a possible method for carrying out the process proposed in the invention, liquid silicone is applied onto a pattern, the silicone is aged and thus hardened to give a silicone foil, and this is then peeled. The silicone foil is then adhesive-bonded onto a carrier, for example a metal plate, a metal cylinder, or a metal foil. The matrix comprises a laser-engravable layer or layer composite which comprises a laser-engravable layer, where the laser-engravable layer comprises a binder and also optionally other additional and auxiliary substances. The laser-engravable layer is preferably moreover elastomer.

The laser-engravable layer which is preferably elastomer, or the layer composite can preferably be present in a carrier. Examples of suitable carriers are woven fabrics and foils made of polyethylene terephthalate (PET), polyethylene naphthalate (PEN), polybutylene terephthalate (PBT), polyethylene, polypropylene, polyamide, or polycarbonate, preferably PET foils or PEN foils. Paper and knitted fabrics, for example made of cellulose, are likewise suitable as carriers. Carriers used can also comprise conical or cylindrical tubes made of the said materials (sleeves). Woven glassfiber fabrics or composite materials made of glass fibers and of polymeric materials are suitable as sleeves. Other suitable substrates are metallic carriers, for example carriers in solid or woven-fabric form, in sheet or cylindrical form, made of aluminum, of magnetizable spring steel or of other types of steel, or of other iron alloys.

In an embodiment of the present invention, the carrier can have a coating of an adhesive layer in order to improve adhesion of the laser-engravable layer. In another embodiment of the solution proposed in the invention, no adhesive layer is required.

In the process proposed in the invention for the continuous production of multilayer composites, the step in which the at least one polyurethane layer is produced in a matrix with passage through at least one coating unit and a plurality of heating units is undertaken within the treatment section in opposition to the conveying direction of the substrate web. The matrices removed from the transfer section are introduced from their removal point into the treatment section for the retreatment of the matrices and from this are reintroduced in a manner of the circuit, at the input point, into the transfer section where the substrate web is processed.

In another embodiment of the process proposed in the invention, the matrix that shapes the at least one polyurethane layer is transported back from a removal position to its input position during the conduct of the step of the production of at least one polyurethane layer with passage through at least one coating unit and a plurality of heating units.

In the solution proposed in the invention, between the transfer section for the conveying of the substrate web and the treatment section for the treatment of the matrices there is not only automated introduction for the matrices but also automated upward transport for the matrices, and operations which have hitherto been manual can therefore be omitted, and the throughput times of the process proposed in the invention are considerable increased.

In the solution proposed in the invention, after the matrices have been removed at the removal point from the transfer section they are turned during outward transport from the transfer section to the treatment section, and reach the treatment section with a side, in particular a structured side, accessible from above, in such a way that the matrices removed from the transfer section can immediately be inserted into the retreatment process which takes place in the treatment section for the matrices.

In another embodiment of the solution proposed in the invention, the substrate web is conveyed as roll product in conveying direction to a wind-up unit and is simultaneously unwound continuously as roll product from a roll core. The substrate web used can comprise either a substrate provided with spray adhesive or a substrate which is provided with a network adhesive, or a substrate web already coated with a heat-activatable adhesive can be used.

At input point, the matrices treated in the treatment section in opposition to the conveying direction of the substrate web in the transfer section are placed by way of an automated handling device, for example a handling robot, with their structured side onto the substrate web conveyed in conveying direction. This can be achieved in that the automated handling device for introduction of the "new" matrices moves concomitantly in conveying direction with the same speed as the substrate web.

In the process proposed in the invention for the continuous production of multilayer composites, during passage through a heatable press device, within a composite made of the matrix and of the substrate web section, at least one polyurethane layer comprised in the matrix is transferred onto that part of the substrate web that is covered by the structured side of the matrix. The length selected for the heatable press device depends on the conveying speed of the substrate web in conveying direction and on the prevailing temperature level required to ensure full transfer of the at least one polyurethane layer from the matrix to the upper side of the substrate to be treated.

After passage through the press device in which, in the process proposed in the invention, the at least one polyurethane layer is transferred onto the substrate web, the composite made of substrate web and matrix passes through a cooling device. In this, both the matrix and the substrate web, which now has been coated with the at least one polyurethane layer, are cooled. After passage through the cooling device, the fully treated substrate web is wound up in a wind-up unit, where it continues to take the form of roll product, and can easily be handled by way of automated handling devices, by way of example for driverless transport systems, forklifts, or the like, in contrast to damage-prone prefabricated section used in current processes and derived from prefabricated substrate.

Downstream of the cooling device, the matrix is removed from the substrate web, so that the matrix can be reintroduced into retreatment in the treatment section for coating. In particular, the matrix removed from the substrate web at the removal point is turned during outward transport from the transfer section and the introduction into the treatment section, so that the structured side of the matrix is freely accessible when it reaches the treatment section. In principle, it is possible that each matrix has a different design, i.e. a different structured surface.

The invention moreover provides a production plant for carrying out the process for the production of multilayer composites. The production plant proposed in the invention comprises at least the following components:
- a transfer section for the treatment of substrate web with a heatable press device,
- a removal position for matrices acting on the substrate web,
- an automated outward transport system for the matrices and introduction of these into a treatment section for the retreatment of the matrices,
- retreatment of the matrices in the treatment section, and
- automated introduction of the matrices into the transfer section, and input/introduction of the matrices onto the substrate web conveyed continuously in conveying direction.

The production plant proposed in the invention provides the possibility of producing multilayer composites in a manufacturing process which proceeds continuously and has no stoppage times. The production plant as proposed in the invention permits faster and therefore substantially more efficient manufacture of substrate web which is introduced as roll product which can continue to be handled as roll product after full treatment. The production plant proposed in the invention permits manufacture of 5.12 $m^2$/min of web, where this output can also be varied via a waiting time in the press device. Because the substrate takes the form of web as roll product, there is no prefabrication of the substrate, no prefabrication costs. A wound-up web can be handled substantially more easily and reliably than prefabricated sections of substrate. Furthermore, no personnel is required for the placing of the matrices on the prefabricated sections of substrate that are currently coated individually and separately. Nor is there any need to retain personnel for the peeling (demolding) of the matrices from the substrate. Once the fully treated substrate web is finished it is wound up again, and handling of the resultant roll product is substantially easier than that of prefabricated pieces of substrate which generally are handled manually and are subject to a high risk of damage.

The production plant proposed in the invention comprises the press device, which is preferably designed to be heatable, and which can be designed as roller press or as flat-bed lamination system. The preferably heatable press device, integrated into the transfer section in conveying direction of the substrate web can have temperature-controllable rolls which define the upper side and, respectively, lower side of the path along which the web is conveyed through the heatable press device. The made of the substrate web and of matrix situated thereon, comprises at least one transferable polyurethane layer, which runs through the press device, so that by virtue of the pressure prevailing in the press device and of the temperature prevailing there the at least one polyurethane layer prepared in the matrix, adhering thereto, and a polyurethane layer composite, is transferred by virtue of the pressure and the heat onto the upper side of the web to be treated.

The introduction of the matrices, which are prepared in advance in the corresponding treatment section, into the transfer section is achieved via an automatable handling device which can by way of example take the form of a robot arm or of any other automated handling system. The production plant moreover comprises, downstream of the heatable press device, a cooling device in which the composite formed from matrix and from web is cooled, and the cooling device here is followed by a removal position for the matrices. At said removal position, the matrices are likewise removed via an automatable handling device, for example a handling robot, from the upper side of the treated web, and are turned during outward transport, and are introduced in the turned condition, i.e. with their structured side facing upward, into the treatment section for the retreatment of the matrices.

The substrate web passes through the transfer section in a direction opposite to the conveying direction of the matrices to be retreated in the treatment section. The transfer section for the web and the treatment section for the retreatment of the matrices are arranged adjacent to one another, for example arranged parallel to one another, and are connected to one another via the two handling systems mentioned firstly for introduction and secondly for outward transport of the matrices, in such a way that the production plant proposed in the invention for the production of multilayer composites realizes a circuit in relation to the matrices.

In an embodiment of the production plant proposed in the invention, in particular of the transfer section, this comprises an unwind unit for web, and also a wind-up unit which can have an associated input unit for an adhesive material. The production plant, in particular the transfer section of the production plant, can process substrate web provided either via a substrate provided with spray adhesive or via a substrate which is provided with a network adhesive, or which takes the form of a substrate which has already been coated with a heat-activatable adhesive. For the coating of web that has not been provided with adhesive material, the unwind unit of the transfer section can have an associated spray-application unit for adhesive material and a downstream dryer unit.

In an advantageous embodiment of the production plant proposed in the invention, the wind-up unit for the fully treated substrate webs can have an associated feed for an interlay. An interlay which separates the freshly treated upper side of the substrate web on wind-up onto a roller core can in particular be required when delicate soft-touch structures are involved which could become damaged in the wound-up state by virtue of the increasing weight of the roll, provides insulation between the individual wound layers, and therefore provides protection from damage.

The transfer section of the production plant proposed in the invention comprises the removal point for the matrices, preferably arranged downstream of the cooling device, and also the input unit for retreated matrices upstream of the heatable press device, which may be a roller press or a flat-bed lamination system.

The invention is described in more detail with reference to the drawing.

Figure 1:
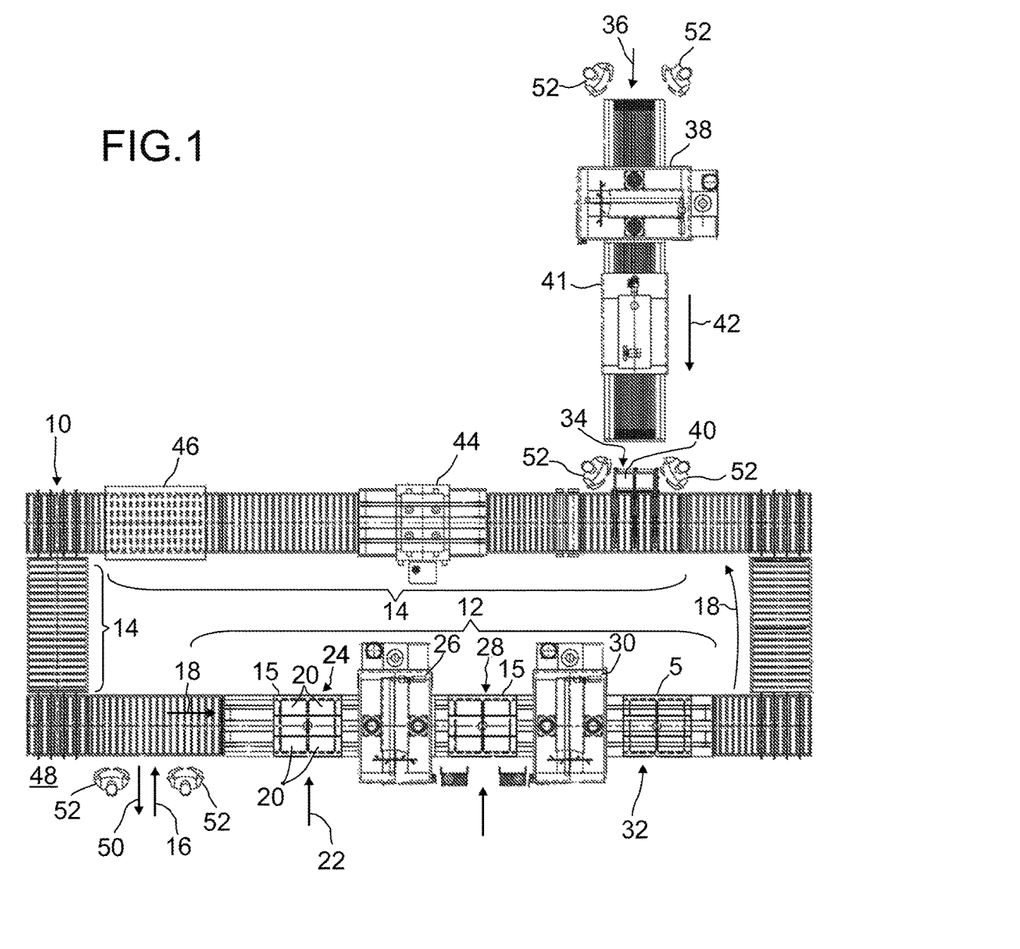
FIG. 1 shows a production process for multilayer composites according to the prior art with operations that are to be carried out manually and FIG. 2 is a schematic diagram of the production plant proposed in the invention where, in a transfer section, a web material is transported in a conveying direction and, in a treatment section arranged parallel thereto, matrices are retreated in opposite direction.

FIG. 1 is a schematic diagram of a production process for multilayer composites still requiring many manual interventions.

FIG. 1 shows a circuit 10 in which, within a first section 12 of the circuit, matrices 15 are conveyed in a conveying direction 18 and, in a second section 14 of the circuit, a composite which comprises a matrix 15 and a substrate material 40 is transported—likewise in a conveying direction 18.

According to FIG. 1, a matrix 15 is introduced to the first section 12 of the circuit at an input 16. The matrix 15 is a silicone matrix or the like which can have an exterior size of from 1.2 m×1.2 m to 1.6 m×1.6 m. At least one polyurethane layer is shaped in said matrix 15. At the beginning of the treatment in the first section 12 of the circuit for matrices 15, the treatment of the matrix 15 takes place in a first heating unit 24 at a start point 22, this being the first treatment step. The first heating unit 24 can comprise one or more infrared sources, and also a plurality of heating zones. There can also be other heat sources installed in the first heating unit 24 in order to heat the matrix 15. After passage through the first heating unit 24, the preheated matrix 15 passes into a first coating unit 26. In this, a polyurethane spray or a polyurethane layer is applied onto the preheated matrix 15. The structure of the matrix is produced via sudden evaporation of water droplets when the polyurethane spray encounters the hot surface 78 of the matrix 15. As soon as the matrix 15 has left the first coating unit 26, the matrix 15 treated in the first coating unit 26 is introduced into an intermediate dryer 28. The intermediate dryer 28 can likewise have one or more infrared sources, and also a plurality of heating zones, in order to dry, by way of example, a polyurethane layer applied in the first coating unit 26; another possibility here is to use heat sources other than infrared sources in the context of the intermediate dryer 28. After passage through the intermediate dryer 28, the matrix 15 passes into another, second coating unit 30. Here, the matrix 15 is again coated with another polyurethane layer. The second coating unit 30 is followed by another intermediate dryer 32. After the further intermediate dryer 32 in the conveying direction 18, fully treated matrices 15 leave the first section 12 of the circuit 10, and are introduced into the second section 14 of the circuit.

The fully treated matrices 15 leaving the first section 12 of the circuit are introduced into an assembly system 34. The assembly system 34 produces a composite made of a substrate material 40 and of a fully treated matrix 15 which has left the first section 12 of the circuit in a conveying direction 18.

At a substrate-material input 36, operators 52 introduce the substrate material 40 into an input unit 38 in which an adhesive, by way of example heat-activated, is applied onto the substrate material, which has been prefabricated in discrete dimensions which correspond to the dimensions of the matrices 15. Once the adhesive has been applied in the input unit 38, the substrate material 40, now provided with a layer of adhesive 38, is introduced into a dryer. In the dryer 41 the adhesive is predried. The substrate material 40 is conveyed onward in the conveying direction 42 and applied by other operators 52 onto a fully treated matrix 15 which is leaving the first section 12 of the circuit. At the assembly system 34, the substrate material 40 provided with a predried adhesive layer 38 is therefore brought into contact manually with the fully treated matrix 15 provided with at least one polyurethane layer.

The composite made of substrate material 40 and matrix 15 is introduced into a press unit 44 in conveying direction 18. The press unit 44 is by way of example a hydraulic press. This can treat at most two composites, in each case comprising a matrix 15 and a section 40 of substrate material, and it is therefore the component that limits the conveying speed in the second section 14 of the circuit. The dwell time for the transfer of the at least one polyurethane layer, shaped in the matrix 15, onto the substrate material 40, pretreated via the layer with adhesive 38, is at least 30 s.

After expiry of this period, the composite made of substrate material 40 and matrix 15 is introduced into a cooling section 46. After passage through the cooling section 46, the composite made of matrix 15 and substrate material 40 has reached an endpoint 48 of the second section 14 of the circuit. At the endpoint 48 of the second section 14 of the circuit, the composite, i.e. the matrix 15 and the fully treated substrate material 40, is removed manually 50 from the circuit 10. The removal is likewise carried out by operators 52. The manual removal 50 at the endpoint 48 of the second section 14 of the circuit involves on the one hand removal of the used matrix 15 and on the other hand, at the endpoint 48, the manual removal 50 of the fully treated substrate material 40. This, in the form of an individual material section, is then introduced into a further process, into onward transport, or into intermediate storage. Since the operators 52 are required to handle relatively large thin flexible two-dimensional pieces in the order of size of from 1.20 m×1.20 m to 1.60 m×1.60 m, there is a considerable risk that the ready-coated visible sides of the substrate material 40 will be damaged. The manual removal 50 at the endpoint 48 moreover also involves removal of the matrices 15. After a check to determine whether these are suitable for reuse or for some other type of retreatment, they can be returned to the start point 22 for the matrices 15 for the first section 12 of the circuit. Alternatively, said matrices 15 can be replaced here by matrices 15 of this type with another design, i.e. with a differently structured surface 78, and introduced to the start point 22.

Figure 2:
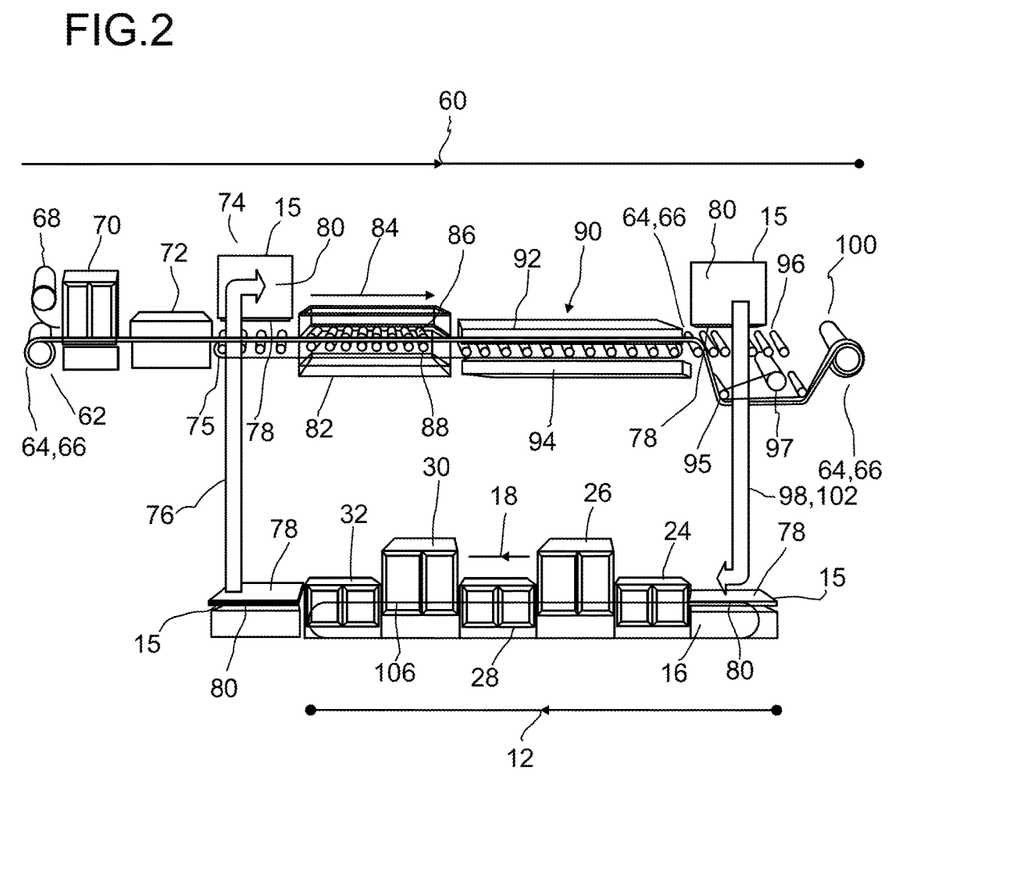

FIG. 2 describes in some detail the process proposed in the invention for the continuous production of multilayer composites, and also, in diagrammatic form, a production plant 10 suitable for that purpose.

FIG. 2 shows that matrices 15 are removed at a removal position 96 from a transfer section 60 of the production plant proposed in the invention for carrying out the process of the invention for the continuous production of multilayer composites. The matrices are introduced into the input 16 for the matrices 15 of the first section 12 of the circuit by an outword transport system 98 which according to the process of the invention preferably uses automated handling devices, such as robots or robot arms. In the context of the first section 12 of the circuit, the matrices 15 introduced into the input 16 are positioned in such a way that the structured side 78 that is to be treated of the matrices 15 is accessible from the upper side of the matrices 15. The matrices 15 are introduced into the first heating unit 24, within which the matrices 15 introduced are heated by way of heat sources, such as infrared sources. The heating within the first heating unit 24 can be achieved from both sides of the matrix, i.e. the heat sources can be on the structured side 78 and also on the unstructured side 80. After passage through the first heating unit 24, the heated matrices 15 are introduced into the first coating unit 26. In the first coating unit 26, at least one polyurethane layer is applied onto the matrix 15 by analogy with the previous description relating to the depiction according to FIG. 1. After passage through the first coating unit 26, the pretreated matrices are transported onward in conveying direction 18 by means of a conveyor belt 106 in the first section 12 of the circuit, until the matrices 15 reach the intermediate dryer 28. The matrices 15 coated in the first coating unit 26 are dried in the intermediate dryer 28. Downstream of the intermediate dryer 28, the matrices are introduced into the second coating unit 30. Here, the matrix 15 is again coated with another polyurethane layer, and the matrix 15 is then transported onward in conveying direction 18 to the intermediate dryer 32. Once the material has left the intermediate dryer 32, section 12 of the circuit has ended.

At the end of the first section 12 of the circuit, matrices 15 are available which have the unstructured side 80, i.e. an underside, and which on their structured side 78, i.e. the freely accessible upper side of the matrix 15, have been fully treated, i.e. have been provided with a single- or multilayer structure made of polyurethane layers. The fully treated matrices are removed from the first section 12 of the circuit according to FIG. 2 by way of a handling system, for example an automated handling system, for example a robot arm or the like, and are introduced into an input point 74 of the transfer section 60 of the production plant.

As can be seen from FIG. 2, a substrate web 64 is introduced to the transfer section 60 at an unwind unit 62. The introduction of the substrate web 64 to the transfer section 60 takes place continuously in the form of a continuous process. The substrate web 64 can by way of example be a substrate material 64 already provided with a spray adhesive, or a substrate web 64 which has a network adhesive, being introduced thereto at a feed unit 68. The substrate web can also be a substrate material of this type which has already been provided with heat-activatable adhesive, i.e. a substrate web 66 which does not then require provision of an adhesive or of an adhesive layer. The substrate web 64, 66 passes from the unwind unit to a coating unit 70 at which optionally at a coating unit 70 (spray chamber) a liquid adhesive, a hot melt, or a powder adhesive is optionally applied to the visible side of the substrate web 64. After passage through the coating unit 70 of the transfer section 60, the substrate web 64, 66 thus pretreated, which passes through the transfer section 60 in conveying direction 84, passes into a dryer 72. In the dryer 72, the substrate web 64, 66 is heated in such a way that an adhesive optionally applied in the coating unit 70 is pre-dried, or any heat-activatable adhesive on the substrate web 66 is activated, before the substrate web 64, 66 reaches the input point 74.

At the input point 74, the matrix 15 removed by way of the automated handling system from the first section 12 of the circuit, where the matrix 15 has been fully treated, is introduced to the substrate web 64, 66. At the input point 74, the fully treated matrix 15, with its structured side 78 facing toward the substrate web 64, is applied to the visible side thereof. Because the substrate web 64, 66 is continuously conveyed in conveying direction 84, in order to avoid relative motion between the structured side 78 of the matrix 15 and the visible side of the substrate web 64, 66, the matrix to be applied to the visible side of the substrate web 64, 66 is optionally moved concomitantly with the substrate web 64, 66 in accordance with the conveying speed thereof, so that the relative speed is zero when the matrix 15 is applied onto the substrate web 64, 66. In order to avoid relative motion between the structured side 78 of the matrix 15 and the visible side of the substrate web 64, 66, a supportive conveyor belt 75 can be moved synchronously with the substrate web 64, 66. In order to minimize the gaps, the placing of the matrices 15 is by way of example sensor-controlled with very small distances from the respective proceeding matrix.

From the input point 74, the composite then present, made of a section of the substrate web 64, 66 and, placed on the visible side thereof, a structured side 78 of the matrix, is introduced into a heatable press device 82. The heatable press device 82 can by way of example be a roller press or else a flat press, or a flat-bed lamination machine. The heatable press device 82 comprises—as shown diagrammatically in FIG. 2—a first roll arrangement 86, and also a second roll arrangement 88. The composite made of matrix 15 and of substrate web 64, 66 is transported in conveying direction 84 between the two roll arrangements 86, 88 in such a way that the temperature of the composite can be controlled by the temperature-controllable rolls of the roll arrangements 86, 88 from the upper side and the underside. During the temperature-control of the composite made of matrix 15 and of substrate web 64, 66, at least one polyurethane layer shaped in the matrix 15 transfers onto the visible side of the substrate web 64, 66, and on the visible side of the substrate web 64, 66 forms a predefined embossment or structure corresponding to the laser engraving of the matrix.

After the transfer of the at least one polyurethane layer from the matrix 15 onto the visible side of the substrate web 64, 66 on passage through the heatable press device 82 the composite made of substrate web 64, 66 and of the matrix 15 enters a cooling device 90 which extends in conveying direction 84 of the substrate web 64, 66. The cooling device 90 can comprise an upper part 92 and a lower part 94, and also a multiplicity of coolable rolls shown diagrammatically in FIG. 2 which can in turn remove, from the composite made of matrix 15 and of substrate web 64, 66, the heat introduced in the heatable press device 82. In the cooling device 90, in the upper part 92 thereof and/or in the lower part 94 thereof, there can be cooling blowers provided which can cool the composite made of matrix 15 and of the substrate web 64, 66. Composites made of matrix 15 and of substrate web 64, 66 that have in each case been heated in the heatable press device 82 to temperatures of from 110 to 130° C. are thus cooled again to a temperature below 50° C.

After passage through the cooling device 90 the matrices with their structured underside 78 are, at the matrix removal point 96, removed from the visible side of the substrate web 64, 66. The visible side of the substrate web 64, 66 then comprises the composite, transferred via the matrix 15, made of at least one, preferably a plurality of, polyurethane layer(s) transferred to the visible side of the substrate web 64, 66.

For the retreatment of the matrices 15, the matrices 15 removed at the output point 96 from the transfer section 60 are introduced, in the context of an output transport system 98, by way of an automated handling device such as a robot arm or the like, to the input point 16 of the first section 12 of the circuit. During the outward transport 98 of the matrices 15 from the removal point 96 to the input point 16, the matrices 15 are turned in such a way that the structured side 78 of the matrices 15 faces upward at the input point 16 of the first treatment section 12, and accordingly the matrices can be reintroduced directly into retreatment in the context of the first section 12 of the circuit. It is preferable that the unstructured underside 80 lies on the conveyor belt 106 of the first section 12 of the circuit, and of the retreatment system for the matrices 15, so that the matrices 15 can be transported continuously through the first section 12 of the circuit.

After removal of the matrices 15 at the removal point 96 via the automated handling device in the context of the outward transport system 98 and after turning 102 of the matrices, the fully treated substrate web 64, 66 is rolled up at a wind-up unit 100 which is part of the transfer section 60 of the production plant proposed in the invention. Because the substrate web 64, 66, inclusive of the composite transferred via the matrix 15 is released downward by way of a take-off roll 95, the matrix 5 is delaminated and can therefore be reintroduced via the handling device 98 with the matrix turning system 102 to the input point for the matrix 15. The fully treated substrate web 64, 66 then takes the form of easy-to-handle roll product in the wind-up unit 100. It is preferable that the arrangement on the visible side of the substrate web 64, 66 has the individual fully treated sections either adjoining one another or following one another with small gaps of a few millimeters. When materials are particularly easily damaged, for example having velvet-like soft-touch finish and the like, damage to the fully treated visible sides of the substrate web 64, 66 can be prevented by introducing an interlay 97 during the wind-up procedure in the wind-up unit 100.

38 Adhesive input unit
40 Substrate web
41 Dryer for substrate web
42 Substrate web conveying direction
44 Press unit (hydraulic)
46 Cooling section
48 Endpoint of composite circuit
50 Manual composite removal
52 Operator
60 Transfer section
62 Wind-up unit: substrate web
64 Substrate web
66 Substrate web with heat-activatable adhesive
68 Network adhesive/spray adhesive feed
70 Coating unit
72 Dryer
74 Matrix input point
75 Conveyor belt drive
76 Matrix feed/automated handling device

| | Piece to Piece Process | | Roll to Roll Process, discontinuous | |
|---|---|---|---|---|
| Calculation of increased production via conversion of the Steron ® P2P process to a discontinuous R2R process | | | | |
| Matrix size | 1.6 m × 1.6 m | 1.6 m × 1.6 m | 1.6 m × 1.6 m | 1.6 m × 1.6 m |
| Area in [m²] | 2.56 | 2.56 | 2.56 | 2.56 |
| Belt speed v in [m/min.] | 3.8 | 3.8 | 5 | 6 |
| Number of matrices/min. | 2 | — | — | — |
| Capacity/min. in [m²] | 5.12 | — | — | — |
| Possible number of matrices, calculated | — | 2.4 | 3.1 | 3.8 |
| Possible capacity/min. in [m²] = v belt * matrix width | — | 6.08 | 8.00 | 9.60 |
| Capacity/h in [m²] | 307 | 365 | 480 | 576 |
| Capacity/24 h in [m²] | 7373 | 8755 | 11 520 | 13 824 |
| Increased production capacity in comparison with piece to piece process in [%] | 0 | 18.8 | 56.3 | 87.5 |
| Productivity increase | ------------------------------------------------------------------------------------------------------> | | | |
| Comments | Capacity restricted to 2 matrices/min. via press cycle frequency Increased belt speed impossibe --> bottleneck is the press! | Yield about 19% higher with no increase in belt speed | Yield about 56% higher through increase in belt speed to 5 m/min! | Yield about 88% higher through increase in belt speed to 6 m/min! |
| Feasibility | Prior art | Through conversion of the plant to discontinuous plant | As before, plus extension of the dryer units required | ditto |
| Other considerations | Higher cost due to prefabrication of substrate material Higher personnel cost for placing substrate web onto matrix Higher cost for removal of finished Steron ® material and storage thereof | + No need for prefabrication of substrate material + No personnel needed for placing substrate web onto matrix + No personnel needed for removal of finished Steron ® material from matrix + Easier and less costly storage possible – May be necessary for particular structures (soft touch) to include an interlay in the winding operation | | |

KEY

10 Circuit for matrix/substrate composite
12 Matrix treatment section
14 Composite treatment section
15 Matrix
16 Matrix input point
18 Matrix conveying direction
20 Heating fields: first heating unit
22 Start point
24 First heating unit (infrared)
26 First coating unit
28 Intermediate dryer (infrared)
30 Second coating unit
32 Further intermediate dryer (infrared)
34 Matrix/substrate assembled to form composite
36 Substrate input
78 Structured side of matrix
80 Unstructured side of matrix
82 Heatable press device (roller press, flat press, flat-bed lamination system)
84 Web conveying direction
86 First temperature-controllable roll arrangement
88 Second temperature-controllable roll arrangement
90 Cooling device
92 Upper part
94 Lower part
95 Take-off roll for substrate web 64, 66
96 Matrix removal point
97 Wind-up unit for interlay
98 Outward transport system for matrix via automated handling device
100 Wind-up unit for substrate web (roll product)
102 Matrix turning system (180° turn)

104 Matrix conveying direction
106 Conveyor belt

The invention claimed is:

1. A process for the continuous production of a multilayer composite comprising:
   at least one substrate web,
   at least one bonding layer, and
   at least one polyurethane layer which has capillaries which extend through the entire thickness of the polyurethane layer,
   the process comprising:
   a) production of the at least one polyurethane layer in a matrix, with passage through at least one coating unit and a plurality of heating units,
   b) introduction of the matrix according to a) to an input point at a transfer section for the substrate web,
   c) application of a structured side of the matrix to the substrate web passing continuously through the transfer section,
   d) treatment of a composite made of the matrix and of the substrate web in a heated press device with transfer of the at least one polyurethane layer to the substrate web,
   e) removal of the matrix for the substrate web,
   f) transfer of the matrix to a treatment section, and
   g) continuous wind-up of the substrate web at a wind-up unit,
   wherein automated introduction and automated outward transport of the matrices take place between the transfer section and the treatment section for the matrices.

2. The process according to claim 1, wherein a) is carried out within the treatment section in opposition to the conveying direction of the substrate web in the transfer section.

3. The process according to claim 1, wherein, during a), the matrix that shapes the at least one polyurethane layer is transported back from a removal position to its input position.

4. The process according to claim 1, wherein, during the outward transport from the transfer section to the treatment section, the matrices are turned, and reach the treatment section with structured side accessible from above.

5. The process according to claim 1, wherein the substrate web is conveyed as a roll product in a conveying direction in the transfer section to the wind-up unit.

6. The process according to claim 1, wherein the substrate web comprises
   a substrate web provided with spray adhesive or
   a substrate web which is provided with a network adhesive, or
   a substrate web already coated with a heat-activatable adhesive.

7. The process according to claim 1, wherein the matrix treated in the treatment section is placed by way of an automated handling device with its structured side onto the web conveyed in a conveying direction.

8. The process according to claim 1, wherein during passage through the heated press device, within a composite made of the matrix and of the substrate web, at least one polyurethane layer comprised in the matrix is transferred onto the substrate web.

9. The process according to claim 1, wherein after passage through a cooling device of the transfer section, a fully treated substrate web is wound up into a wind-up unit.

10. The process according to claim 9, wherein after removal of the matrix downstream of the cooling device, the matrix is reintroduced into the treatment section for retreatment and, during outward transport of the matrix, the matrix is turned.

11. The process according to claim 1, wherein during the continuous wind-up of the substrate web at the wind-up unit in g), an interlay for the protection of delicate structures is wound into the material.

12. A production plant for carrying out the process of claim 1, comprising:
    a transfer section for the treatment of the substrate web with the heated press device,
    a removal position for matrices acting on the substrate web,
    an automated outward transport system for the matrices and for introduction of these into a treatment section for the retreatment of the matrices, and
    an automated introduction system for the matrices from the treatment section into the transfer section.

13. The production plant according to claim 12, wherein the heated press device is a roller press or a flat-bed lamination system, and comprises temperature-controllable roll arrangements and/or IR sources, and/or hot-air blowers.

14. The production plant according to claim 12, wherein the heated press device has temperature-controllable rolls between which a composite made of the substrate web and of the matrix is conveyed in a conveying direction.

15. The production plant according to claim 12, wherein the automated introduction system comprises an automated handling device.

16. The production plant according to claim 12, wherein the automated outward transport system comprises an automated handling device configured to turn the matrices in such a way that the structured side of the matrices is accessible when the treatment section is reached.

17. The production plant according to claim 12, wherein a conveying direction of the substrate web through the transfer section is opposite for the conveying direction of the matrices through the treatment section.

18. The production plant according to claim 12, wherein the transfer section has an unwind unit for the substrate web.

19. The production plant according to claim 18, wherein the unwind unit for the substrate web has an associated input unit for adhesive material, spray adhesive, or network adhesive.

20. The production plant according to claim 12, wherein the transfer section has a wind-up unit for substrate web.

21. The production plant according to claim 20, wherein the wind-up unit has a feed for an interlay which, in the wound-up condition, separates delicate structures on a visible side of the substrate web from one another.

22. The production plant according to claim 12, wherein the removal position for the matrices from the substrate web is downstream of a cooling device.

23. The production plant according to claim 12, wherein the input point for the matrices onto the substrate web is, relative to a conveying direction, upstream of the heated press device.

* * * * *

UNITED STATES PATENT AND TRADEMARK OFFICE
CERTIFICATE OF CORRECTION

PATENT NO.         : 10,071,542 B2
APPLICATION NO.    : 15/120043
DATED              : September 11, 2018
INVENTOR(S)        : Juergen Herrmann Page 1 of 1

It is certified that error appears in the above-identified patent and that said Letters Patent is hereby corrected as shown below:

In the Specification

Column 14, Line 48, delete "outword" and insert --outward--.

Columns 17-18, Line approx. 22, delete "impossibe" and insert --impossible--.

Signed and Sealed this
Sixteenth Day of July, 2019

Andrei Iancu
*Director of the United States Patent and Trademark Office*